(12) United States Patent
Davis

(10) Patent No.: US 7,007,840 B2
(45) Date of Patent: Mar. 7, 2006

(54) MANAGING ACTIVATION OF CARDHOLDERS IN A SECURE AUTHENTICATION PROGRAM

(75) Inventor: Steve Davis, Foster City, CA (US)

(73) Assignee: Visa U.S.A., Inc., San Francisco, CA (US)

(*) Notice: Subject to any disclaimer, the term of this patent is extended or adjusted under 35 U.S.C. 154(b) by 0 days.

(21) Appl. No.: 10/884,855

(22) Filed: Jul. 2, 2004

(65) Prior Publication Data
US 2005/0029344 A1 Feb. 10, 2005

Related U.S. Application Data

(60) Provisional application No. 60/484,927, filed on Jul. 2, 2003.

(51) Int. Cl.
*G06K 5/00* (2006.01)
(52) U.S. Cl. ..................................... 235/380
(58) Field of Classification Search .............. 235/380, 235/375; 705/5, 67, 64, 75, 77
See application file for complete search history.

(56) References Cited

U.S. PATENT DOCUMENTS

| | | | | |
|---|---|---|---|---|
| 5,903,878 A | * | 5/1999 | Talati et al. | 705/26 |
| 6,618,705 B1 | * | 9/2003 | Wang et al. | 705/26 |
| 6,636,894 B1 | * | 10/2003 | Short et al. | 709/225 |
| 6,687,390 B1 | * | 2/2004 | Avni et al. | 382/119 |
| 2001/0044787 A1 | * | 11/2001 | Shwartz et al. | 705/78 |
| 2002/0091646 A1 | * | 7/2002 | Lake et al. | 705/67 |
| 2002/0111919 A1 | * | 8/2002 | Weller et al. | 705/67 |
| 2002/0133467 A1 | * | 9/2002 | Hobson et al. | 705/64 |
| 2002/0194138 A1 | * | 12/2002 | Dominguez et al. | 705/64 |
| 2003/0126094 A1 | * | 7/2003 | Fisher et al. | 705/75 |
| 2003/0208682 A1 | * | 11/2003 | Zissimopoulos et al. | 713/182 |
| 2003/0216990 A1 | * | 11/2003 | Star | 705/35 |

FOREIGN PATENT DOCUMENTS

WO    WO 04/079603    9/2004

* cited by examiner

*Primary Examiner*—Thien M. Le
*Assistant Examiner*—Edwyn Labaze
(74) *Attorney, Agent, or Firm*—Townsend and Townsend and Crew LLP

(57) ABSTRACT

Merchants or other third parties can add an activation link on their Internet site. The activation link can be associated with text or an image, for example a logo. The activation link can be presented to cardholders visiting an Internet site prior to the cardholder initiating a transaction. Upon selecting the activation link, a cardholder is redirected to activation site. The activation site can be a generic site intended for any cardholder, or an activation site specifically tailored to the referring site, for example having branding associated with the referring site.

20 Claims, 2 Drawing Sheets

MANAGING ACTIVATION OF CARDHOLDERS IN A SECURE AUTHENTICATION PROGRAM

CROSS-REFERENCES TO RELATED APPLICATIONS

This application claims priority to U.S. Provisional Patent Application No. 60/484,927, entitled "Managing Activation of Cardholders in a Secure Authentication Program," filed Jul. 2, 2003, which is incorporated by reference herein for all purposes.

BACKGROUND OF THE INVENTION

Electronic commerce cards are frequently used by consumers to make purchases from merchants over the Internet. Electronic commerce cards include credit cards, debit cards, prepaid purchase cards, travel cards, or any other system that can be used instead of cash to purchase goods or services. One example of an authentication system enables a cardholder to associate a password or other identifying information with an electronic commerce card. To make a purchase online, the consumer must provide the password or other identifying information associated with the electronic commerce card. This ensures that the person possessing the electronic commerce card is actually authorized to use the electronic commerce card.

Electronic commerce card associations can encourage merchants to support authentication systems by offering more favorable terms to merchants for authenticated transactions. However, for an authentication system to be successful, it must be adopted by a large number of cardholders. Previously, card issuers have required unauthenticated cardholders to enroll in the authentication system, a procedure referred to as card activation, in order to complete a purchase. This requirement disrupts consumers' shopping process and can lead to lost sales for the merchant.

Therefore, it is desirable to provide credit card associations, merchants, card issuers, and other parties with a system enabling cardholders to activate their cards at any convenient opportunity. It is further desirable that the system provides cardholders with a way to contact the card issuer for support.

BRIEF SUMMARY OF THE INVENTION

Merchants or other third parties can add an activation link on their Internet site. The activation link can be associated with text or an image, for example a logo. The activation link can be presented to cardholders visiting an Internet site prior to the cardholder initiating a transaction. Upon selecting the activation link, a cardholder is redirected to activation site. The activation site can be a generic site intended for any cardholder, or an activation site specifically tailored to the referring site, for example having branding associated with the referring site.

In an embodiment, a system for initiating the enrollment of an electronic commerce card in an authentication program includes an initial enrollment website, an activation link directing a cardholder system to the initial enrollment website, and an access control server directory including a directory of access control servers. Each access control server is associated with at least one of a plurality of card issuers. The initial enrollment website is adapted to receive an enrollment request for an electronic commerce card from the cardholder system, to communicate the enrollment request to the access control server directory, and to receive enrollment information from the access control server directory. In response to the enrollment information indicating the electronic commerce card is eligible for enrollment, the initial enrollment website is further adapted to redirect the cardholder system to a secondary enrollment website associated with the access control server associated with one of the plurality of card issuers providing the electronic commerce card.

In a further embodiment, the enrollment information includes an indication that the access control server associated with one of the plurality of card issuers providing the electronic commerce card supports the authentication program. The directory of access control servers may include for each access control server an indication of whether the access control server supports the authentication program.

In an additional embodiment, the activation link is provided by a merchant website. The initial enrollment site may include branding associated with the merchant website.

In another embodiment, the secondary activation website is adapted to collects authentication information from cardholder system. In a further embodiment, the secondary activation website is adapted to return customer service information to the cardholder system. In still another embodiment, the enrollment request includes information identifying the one of the plurality of card issuers providing the electronic commerce card. The information identifying the one of the plurality of card issuers providing the electronic commerce card includes at least a portion of an electronic commerce card number.

In yet an additional embodiment, in response to a determination that the one of the plurality of card issuers providing the electronic commerce card supports the authentication program, the access control server directory is adapted to query the access control server associated with one of the plurality of card issuers providing the electronic commerce card to determine if the electronic commerce card is eligible for enrollment. Additionally, the access control server directory is adapted to receive a query response from the access control server associated with one of the plurality of card issuers providing the electronic commerce card.

In a further embodiment, the access control server directory is adapted to communicate an enrollment request to an attempted enrollment access control server in response to a determination that the one of the plurality of card issuers providing the electronic commerce card does not supports the authentication program.

BRIEF DESCRIPTION OF THE DRAWINGS

The invention will be described with reference to the drawings, in which.

DETAILED DESCRIPTION OF THE INVENTION

Figure 1:
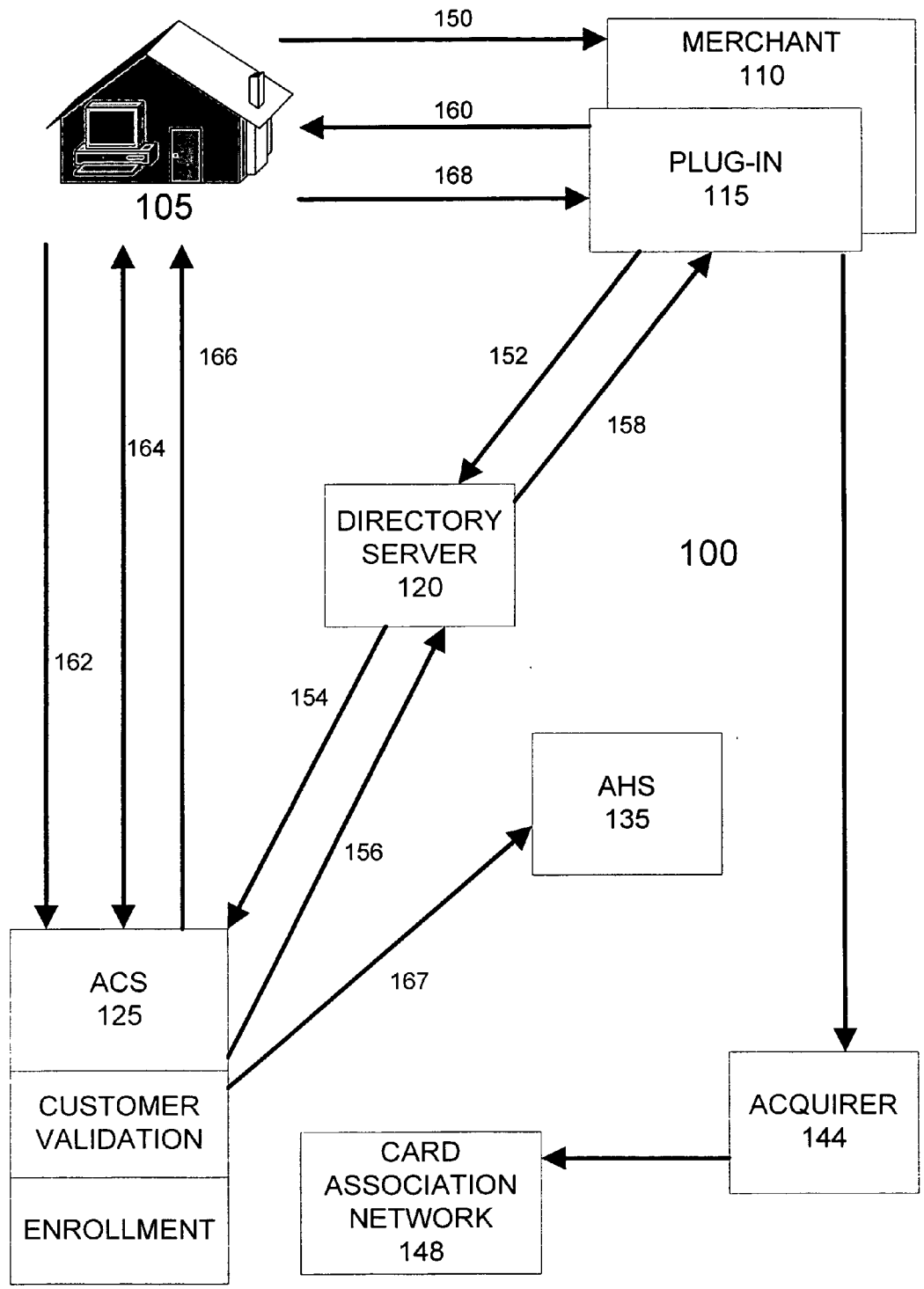
FIG. 1 illustrates a prior decentralized card authentication system 100.

FIG. 1 illustrates a prior decentralized card authentication system 100. System 100 enables cardholders to be authenticated when making electronic commerce card purchases online. Cardholder system 105 initiates an online purchase by accessing a merchant computer 110. In an embodiment, cardholder system 105 accesses a website provided by the merchant computer 110 via the Internet via a web browser. Alternatively, cardholder system 105 can access the merchant computer 110 via an alternate electronic communications network. The cardholder system 105 can be any type of communications device, for example a personal computer, a personal digital assistant, or a telephone.

To complete a purchase, a cardholder uses the cardholder system 105 to submit her electronic commerce card information 150, such as a card number and expiration date, to the merchant system 110. In an embodiment, a secure communication system, such as SSL, is used for all communications, including the electronic commerce card information 150.

In response to the electronic commerce card information 150, the merchant system initiates an authentication procedure to determine whether the electronic commerce card information is valid and has been provided by an authorized cardholder. In an embodiment of system 100, there are numerous electronic commerce card issuers. Each electronic commerce card issuer is responsible for authenticating its own electronic commerce cards. To authenticate the electronic commerce card information 150, the merchant system 110 must locate the authentication service of the electronic commerce card issuer associated with the electronic commerce card information 150.

The merchant system sends a verifying enrollment request (VEReq) 152 to a directory server 120 to locate the appropriate authentication service. In an embodiment, all authentication-related communication is coordinated by an authentication plug-in 115 integrated with the merchant system 110. The VEReq 152 includes at least a portion of the electronic commerce card information 150 to be used by the directory server 120 to identify the authentication service associated with the cardholder's electronic commerce card. In an embodiment, each electronic commerce card issuer is assigned a different range of electronic commerce card numbers. This embodiment of the directory server 120 includes a list of all electronic commerce card issuers and their associated electronic commerce card number ranges. By comparing the electronic commerce card information with the list of electronic commerce card issuers, the directory server 120 is able to identify the appropriate authentication service.

After identifying the authentication service, the directory server 120 forwards the VEReq 154 to an access control server (ACS) 125 associated with the card issuer's authentication service. The ACS 125 determines whether the card information provided in the VEReq 154 can be authenticated. Card information may not be able to be authenticated by the ACS 125 if, for example, the card information does not include a valid electronic commerce card number, or if there is no authentication information associated with the electronic commerce card number.

If the electronic commerce card information provided in the VEReq 154 can be authenticated, the ACS 125 sends a verified enrollment response (VERes) 156 back to the directory server 120. The VERes 156 includes a message indicating that the ACS 125 can authenticate the electronic commerce card information and a pseudonym corresponding to the card number. The pseudonym can be any type of code or number that can be uniquely linked to card information by the ACS 125 at a later time. The VERes also includes a URL to be accessed by the cardholder system 105 to authenticate the cardholder. For system 100, the URL is associated with a web site provided by the ACS 125. Upon receiving a VERes from the ACS 125, the directory server 120 forwards the VERes 158 to the merchant system 110.

From the received VERes, the merchant system 110 generates an authentication request. The authentication request includes the pseudonym created by the ACS 125 and transaction information associated with the cardholder's prospective purchase. The merchant system then forwards the authentication request 160 to the cardholder system 105. In an embodiment, the authentication request is sent to the cardholder system 105 with a web page having a redirection command, such as an HTTP redirect, to a web site hosted by the ACS 125. This web page also includes a URL for returning information to the merchant system 110.

In response the authentication request received from the merchant system 110, the cardholder system 105 accesses 162 a web site hosted by the ACS 125. In accessing this web site, the cardholder system 105 supplies the ACS 125 with the pseudonym originally created by the ACS for the VERes.

The cardholder to authenticates her identity by presenting authentication information 164 to the web site provided by the ACS 125. In an embodiment, the cardholder authenticates her identity by providing to the ACS 125 a password or other identifying information previously associated with the electronic commerce card. The ACS 125 uses the pseudonym provided by the cardholder system to identify the electronic commerce card being supplied by the cardholder and retrieve authentication information previously associated with the electronic commerce card. In an embodiment, the ACS 125 matches the pseudonym received via the authentication request 162 with the pseudonym previously created for VERes 156. In a further embodiment, the pseudonym expires after a limited period of time, for example five minutes, to prevent fraudulent reuse of the authentication request.

The ACS 125 returns an authentication response 166 to the cardholder system 105. The cardholder system 105 in turn forwards the authentication response 168 to the merchant system 110. If the authentication information 164 provided by the cardholder matches the authentication information previously associated with the electronic commerce card, the authentication response includes a message indicating that the authentication was successful. Alternatively, the authentication response can include a message indicating that the authentication failed. In a further embodiment, the authentication response also includes an error code identifying the reason for authentication failure.

In addition to sending the authentication response to the merchant system 110, a copy of the authentication response 167 is sent to an authentication history server 135. The authentication history server 135 maintains an archive of all authentications performed by the system 100. The authentication response is digitally signed to prevent the cardholder system 105 or other third party systems from tampering with the contents of the authentication response.

After receiving the authentication response 168, the merchant system 110 validates the authentication response. To validate the authentication response 168, the merchant system 110 first verifies the digital signature associated with the authentication response to ensure that there has not been any tampering. Once the authentication response is determined to have arrived intact, and the response is for the request originally submitted, the contents of the authentication response are analyzed to determine if authentication has been successful. If the authentication was not successful, the merchant system 110 halts the transaction. If the authentication was successful, the merchant system 110 can continue with the transaction by initiating a charge to the electronic commerce card provided by the cardholder. In an embodiment, the merchant system 110 charges the electronic commerce card by submitting the card information to a card acquirer 144. The card acquirer then sends the charge request over a private card association network 148 to be processed by the electronic commerce card issuer associated with the card. In a further embodiment, an electronic commerce indicator and a Cardholder Authentication Verification Value, which indicates that the electronic commerce card has been successfully verified, is included with the charge request.

Figure 2:
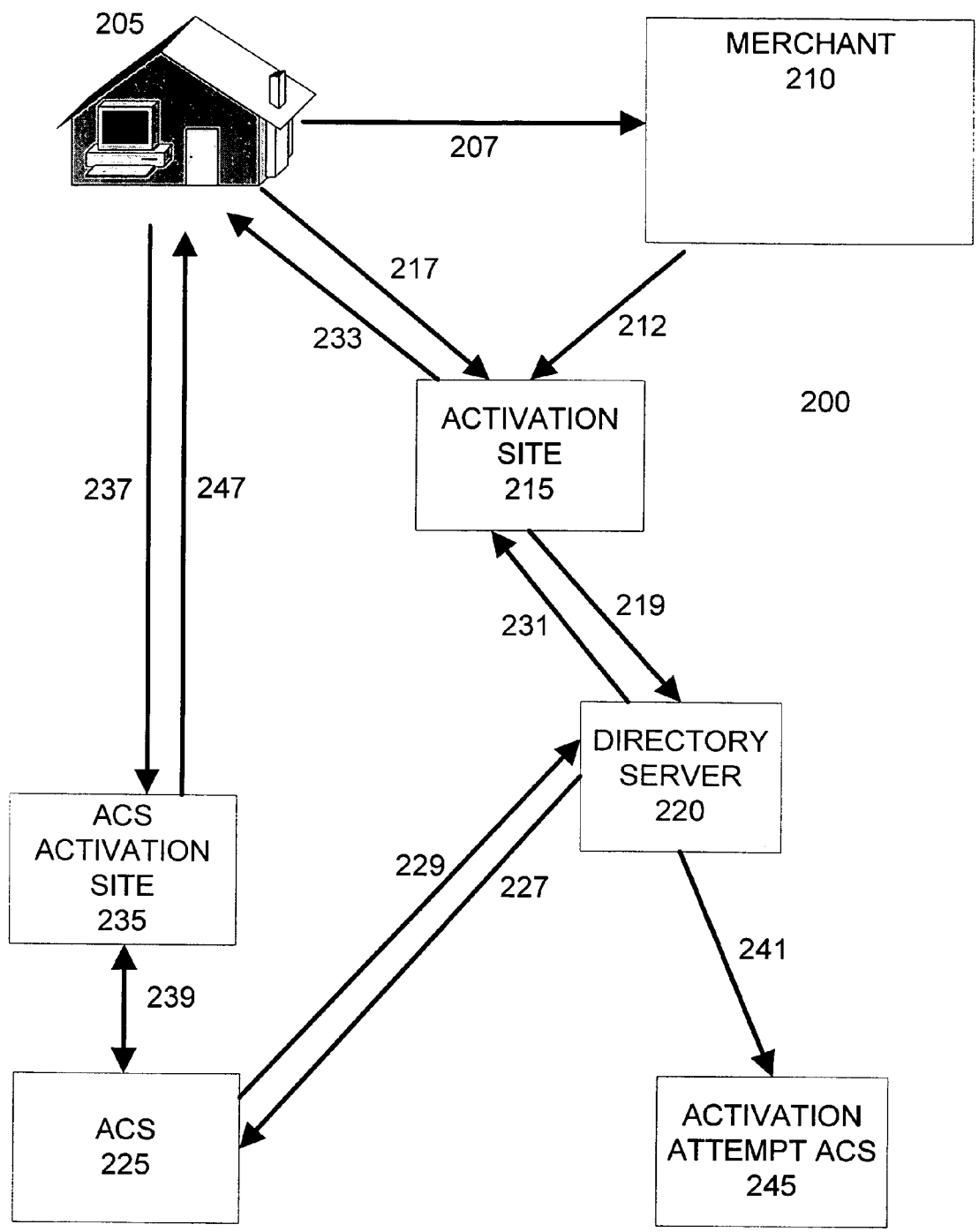
FIG. 2 illustrates a system enabling cardholders to activate their cards according to an embodiment of the invention.

FIG. 2 illustrates a system 200 enabling cardholders to activate their cards according to an embodiment of the invention. In this embodiment, a cardholder system 205 accesses 207 a merchant or other third party computer 210. In an embodiment, cardholder system 205 accesses 207 a website provided by the merchant computer 210 via the Internet via a web browser. Alternatively, cardholder system 205 can access 207 the merchant computer 210 via an alternate electronic communications network. The cardholder system 205 can be any type of communications device, for example a personal computer, a personal digital assistant, or a telephone.

The merchant computer system 210 provides a hyperlink or other type of reference to the cardholder system 205. This hyperlink, referred to as an activation link, can be associated with text or an image, for example a logo. In an embodiment, the activation link can be presented to the cardholder system 205 visiting an Internet site prior to the cardholder system 105 initiating a transaction. For example, a merchant website can feature the activation link on its homepage. In an additional embodiment, the merchant system 210 can provide incentives to the cardholder to encourage the cardholder to initiate activation.

Upon selecting the activation link, the cardholder system 205 is redirected 212 to an activation site 215. The activation site 215 can be a generic site intended for cardholder systems referred by any one of a plurality of unrelated merchant systems, including merchant system 210, or a site specifically tailored to the referring merchant site, for example having branding associated with the referring merchant site 210.

The activation site 215 prompts the cardholder system 205 to enter all or a portion of their electronic commerce card number. This information 217 is returned to the activation site 215, where it is used to determine whether the electronic commerce card can be activated. In an embodiment, the card association includes a number of independently operating card issuers, each of which may or may not support the card associations authentication system. In this embodiment, an electronic commerce card can be activated if the card issuer responsible for issuing the electronic commerce card of the cardholder system 205 supports the card association's authentication system. To determine whether the card issuer supports the authentication system, an embodiment of the activation site 215 encrypts the information 217 into a verification request 219. The verification request 219 is forwarded to a card issuer directory server 220.

The card issuer directory server 220 determines whether the access control server (ACS) associated with the card issuer supports the authentication system. In an embodiment, the directory server 220 maintains a listing of all of the ACS systems operating within the system 200 by the plurality of card issuers. In this example, ACS 225 is associated with the card issuer that issued the electronic commerce card used by the cardholder system 105. If the ACS 225 supports the authentication system, the ACS 225 is queried 227 by the directory server 220 to determine whether the electronic commerce card used by the cardholder system 205 is already activated or eligible for activation. The ACS 225 responds to the directory server's 220 query 227 with the electronic commerce card's enrollment information 229. If the electronic commerce card is eligible for activation and has not already activated, an embodiment of the enrollment information 229 includes a URL for initiating the activation process on the ACS 225. The directory server 220 forwards 231 the enrollment information to the activation site 215.

The activation site 215 receives the enrollment information 231 from the card issuer directory server 220. If the electronic commerce card is eligible for activation and has not already activated, the activation site 215 uses the enrollment information 231 to redirect 233 the cardholder system 205 to a ACS activation site 235. The ACS activation site 235 collects a personal password and other account information 237 from the cardholder system 205 to verify the cardholder's identity and activate the electronic commerce card. The ACS activation site 235 accesses 239 the ACS 225 to verify the cardholder information and to record the activation information, such as a password, to be used to authenticate the cardholder's identity when they use the electronic commerce card for future purchases.

In a further embodiment, if the card issuer directory server 220 determines that the ACS 225 associated with the card issuer does not support the authentication system, the directory server 220 queries 241 an Activation Attempt ACS 245. The Activation Attempt ACS 245 records the attempted activation request. A message informing the cardholder that activation is not supported by the card issuer is then returned to the cardholder system 205.

In yet a further embodiment, the ACS activation site 235 associated with a card issuer can return contact information 247 for the card issuer to the cardholder system 205. The contact information 247 can include telephone numbers, e-mail addresses, and/or URLs for customer support. The contact information 247 can also include URLs for one or more customer support activities, such as updating an account password or accessing and updating account information.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for initiating the enrollment of an electronic commerce card in an authentication program, the system comprising:

an initial enrollment website adapted to be accessed via an activation link directing a cardholder system to the initial enrollment website from a merchant website; and an access control server directory including a directory of access control servers, each access control server associated with at least one of a plurality of card issuers;

wherein the initial enrollment website is adapted to receive an enrollment request for an electronic commerce card from the cardholder system, to communicate the enrollment request to the access control server directory, to receive enrollment information from the access control server directory, and to redirect the cardholder system to a secondary enrollment website associated with the access control server associated with one of the plurality of card issuers providing the electronic commerce card in response to the enrollment information indicating the electronic commerce card is eligible for enrollment.

2. The system of claim 1, wherein the enrollment information includes an indication that the access control server associated with one of the plurality of card issuers providing the electronic commerce card supports the authentication program.

3. The system of claim 2, wherein the directory of access control servers includes for each access control server an indication of whether the access control server supports the authentication program.

4. The system of claim 1, wherein the initial enrollment site includes branding associated with the merchant website.

5. The system of claim 1, wherein the secondary activation website is adapted to collect authentication information from cardholder system.

6. The system of claim 1, wherein the enrollment request includes information identifying the one of the plurality of card issuers providing the electronic commerce card.

7. The system of claim 6, wherein the information identifying the one of the plurality of card issuers providing the electronic commerce card includes at least a portion of an electronic commerce card number.

8. The system of claim 1, wherein the access control server directory is adapted to query the access control server associated with one of the plurality of card issuers providing the electronic commerce card to determine if the electronic commerce card is eligible for enrollment in response to a determination that the one of the plurality of card issuers providing the electronic commerce card supports the authentication program and to receive a query response from the access control server associated with one of the plurality of card issuers providing the electronic commerce card.

9. The system of claim 8, wherein the access control server directory is adapted to communicate an enrollment request to an attempted enrollment access control server in response to a determination that the one of the plurality of card issuers providing the electronic commerce card does not supports the authentication program.

10. The system of claim 1, wherein the secondary activation website is adapted to return customer service information to the cardholder system.

11. A method for initiating the enrollment of an electronic commerce card in an authentication program, the method comprising:

presenting an initial enrollment website to a cardholder system in response to the cardholder system selecting an activation link provided to the cardholder system by a merchant website;

receiving an enrollment request from the cardholder system;

communicating the enrollment request to an access control server directory including a directory of access control servers, each access control server associated with at least one of a plurality of card issuers;

receiving enrollment information from the access control server directory; and redirecting the cardholder to a secondary enrollment site associated with the access control server associated with one of the plurality of card issuers providing the electronic commerce card in response to the enrollment information indicating the electronic commerce card is eligible for enrollment.

12. The method of claim 11, wherein the enrollment information includes an indication that the access control server associated with one of the plurality of card issuers providing the electronic commerce card supports the authentication program.

13. The method of claim 12, wherein the directory of access control servers includes for each access control server an indication of whether the access control server supports the authentication program.

14. The method of claim 11, wherein the initial enrollment site includes branding associated with the merchant website.

15. The method of claim 11, further including collecting authentication information from cardholder system using the secondary activation website.

16. The method of claim 11, wherein the enrollment request includes information identifying the one of the plurality of card issuers providing the electronic commerce card.

17. The method of claim 16, wherein the information identifying the one of the plurality of card issuers providing the electronic commerce card includes at least a portion of an electronic commerce card number.

18. The method of claim 11, further including:

determining if the one of the plurality of card issuers providing the electronic commerce card supports the authentication program in response to the enrollment request;

query the access control server associated with one of the plurality of card issuers providing the electronic commerce card to determine if the electronic commerce card is eligible for enrollment in response in response to a determination that the one of the plurality of card issuers providing the electronic commerce card supports the authentication program; and receiving a query response from the access control server associated with one of the plurality of card users providing the electronic commerce card in response to the querying.

19. The method of claim 18, further including:

communicating an enrollment request to an attempted enrollment access control server in response to a determination that the one of the plurality of card issuers providing the electronic commerce card does not supports the authentication program.

20. The method of claim 11, further including:

returning customer service information to the cardholder system from the secondary activation website.

* * * * *